United States Patent
You et al.

(10) Patent No.: US 9,926,397 B2
(45) Date of Patent: Mar. 27, 2018

(54) VINYLPYRIDINE RESIN FOR CATALYST CARRIERS AND METHOD OF MANUFACTURING THE SAME

(75) Inventors: Zhixiong You, Yokohama (JP); Takeshi Minami, Yokohama (JP); Chikako Hashimoto, Yokohama (JP); Yoichi Umehara, Yokohama (JP)

(73) Assignee: CHIYODA CORPORATION, Yokohama-shi, Kanagawa (JP)

( * ) Notice: Subject to any disclaimer, the term of this patent is extended or adjusted under 35 U.S.C. 154(b) by 211 days.

(21) Appl. No.: 13/370,508

(22) Filed: Feb. 10, 2012

(65) Prior Publication Data

US 2013/0209768 A1    Aug. 15, 2013

(51) Int. Cl.
*C08F 226/06*    (2006.01)
*C08F 212/36*    (2006.01)

(52) U.S. Cl.
CPC ......... *C08F 226/06* (2013.01); *C08F 212/36* (2013.01)

(58) Field of Classification Search
CPC ................................. B32B 7/02; B32B 27/08
USPC ........................................ 428/212, 219, 220
See application file for complete search history.

(56) References Cited

U.S. PATENT DOCUMENTS

| | | | |
|---|---|---|---|
| 4,060,547 A | 11/1977 | Paulik et al. | |
| 4,172,862 A * | 10/1979 | Maximovich | C08F 297/02 525/91 |
| 5,155,261 A | 10/1992 | Marston et al. | |
| 5,364,963 A * | 11/1994 | Minami et al. | 562/519 |
| 5,951,962 A * | 9/1999 | Muller et al. | 423/702 |
| 7,794,838 B2 * | 9/2010 | Yabu et al. | 428/407 |
| 2007/0043199 A1* | 2/2007 | Okamoto et al. | 528/198 |

FOREIGN PATENT DOCUMENTS

| | | |
|---|---|---|
| EP | 0 277 824 A2 | 8/1988 |
| JP | 47-003334 B | 1/1972 |
| JP | 61-025731 B2 | 1/1978 |
| JP | 63-253047 A | 10/1988 |
| JP | 05-306253 A | 11/1993 |
| JP | 05-306254 A | 11/1993 |

(Continued)

OTHER PUBLICATIONS

Extended European Search Report dated Oct. 2, 2012, issued in corresponding European Patent Application No. 12001284.4.

(Continued)

*Primary Examiner* — Lawrence Ferguson
(74) *Attorney, Agent, or Firm* — Westerman, Hattori, Daniels & Adrian, LLP

(57) ABSTRACT

A vinylpyridine resin that is hardly pulverized and thermally decomposed such that the degradation of the catalytic activity is suppressed while having a pore volume and a specific surface area to maintain a sufficient catalytic activity, and also a method of manufacturing the vinylpyridine resin are provided. The resin represents: a volume ratio of the pores having a diameter of 3 through 5 nm to all the pores of not less than 4% and not more than 60%; a total pore volume of not less than 0.15 cc/g and not more than 0.35 cc/g; and a specific surface area of not less than 20 m$^2$/g and not more than 100 m$^2$/g. The resin can be manufactured by using a poor solvent and not less than 50 wt % and not more than 90 wt % of a good solvent as porous agent.

2 Claims, 2 Drawing Sheets

(56) References Cited

FOREIGN PATENT DOCUMENTS

| JP | 06-315637 A | 11/1994 |
|---|---|---|
| JP | 2012-81440 A | 4/2012 |

OTHER PUBLICATIONS

Rodrigues, et al., "Quaternization Reaction of 2-Vinylpiridine and 4-Vinylpiridine Network Copolymers for 4-Nitrophenol Adsorption", Journal of the Brazilian Chemical Society, dated Mar. 2007, vol. 18, No. 2, pp. 431-434, XP002682307, cited in European Search Report dated Oct. 2, 2012.

Malik, et al., "Ion-exchange properties of 4-vinylpyridine-divinylbenzene-based anion exchangers for ferric chloride complex anions", Reactive & Functional Polymers, Elsevier Science Publishers BV, NL, dated Jun. 1, 2002, vol. 51, No. 2-3, pp. 117-120, XP004355417, cited in European Search Report dated Oct. 2, 2012.

Pinto, et al., "Optimization of a cocktail of initiators for suspension polymerization of vinyl chloride in batch reactors", Chemical Engineering Science, dated Feb. 2001, vol. 56, No. 3, pp. 1021-1028, XP55036011, cited in European Search Report dated Oct. 2, 2012.

Malik, "Macroporous 4-vinylpyridine-divinylbenzene—Estimation of pore volume, surface area, and pore size distribution", E-polymers, dated Jul. 19, 2006, vol. 2006, 40, pp. 1-8, cited in European Search Report dated Oct. 2, 2012.

Malik, et al., "Porous 4-Vinylpyridine-Divinylbenzene Copolymers Varying Porosity in Different Bead Sizes of a Single Batch", E-Polymers, dated Nov. 23, 2007, vol. 2007, 135, pp. 1-7, XP002682309, cited in European Search Report dated Oct. 2, 2012.

Arshady, "The Synthesis of Polymer Supports", Advanced Materials, Wiley VCH Verlag, DE, dated Apr. 1, 1991, vol. 3, No. 4, XP000306851, pp. 182-190, cited in European Search Report dated Oct. 2, 2012.

Arshady, "Suspension, emulsion, and dispersion polymerization: A methodological survey", Colloid & Polymer Science, dated 1992, vol. 270, No. 8, pp. 717-732, XP002682310, cited in European Search Report dated Oct. 2, 2012.

Giammatteo, et al., "Cross-linked poly-4-vinylpyridines as useful supports in metal catalysis: micro- and nanometer scale morphology", Journal of Molecular Catalysis A: Chemical, Elsevier, Amsterdam, NL, dated Mar. 30, 2007, vol. 268, No. 1-2, pp. 176-184, XP022008481, cited in European Search Report dated Oct. 2, 2012.

Dombrowski, et al., "A two-stage Horvath-Kawazoe adsorption model for pore size distribution analysis", Studies in Surface Science and Catalysis, dated 2002, vol. 144, pp. 99-106, XP002682311, cited in European Search Report dated Oct. 2, 2012.

Giesche, "Mercury Porosimetry: A General (Practical) Overview", Particle & Particle Systems Characterization, dated Jun. 1, 2006, vol. 23, No. 1, pp. 9-19, XP55036551, cited in European Search Report dated Oct. 2, 2012.

Anonymous, "Autosorb-1 Series", Quantachrome Instruments (Company Brochure), dated Aug. 10, 2008, XP002682312, cited in European Search Report dated Oct. 2, 2012.

* cited by examiner

US 9,926,397 B2

VINYLPYRIDINE RESIN FOR CATALYST CARRIERS AND METHOD OF MANUFACTURING THE SAME

BACKGROUND OF THE INVENTION

Field of the Invention

The present invention relates to a vinylpyridine resin to be used as catalyst carriers for manufacturing acetic acid by carbonylation of methanol and a method of manufacturing such a resin.

Description of the Related Art

Acetic acid is a basic chemical having a broad scope of applications extending from the source material of polyvinyl acetate, acetyl cellulose, and acetic esters to the solvent for terephthalic acid manufacturing plants.

Known methods of manufacturing acetic acid that are being utilized in the chemical industry include carbonylation of methanol, partial oxidation of acetaldehyde, oxidation of butane or propane, and so on. Among them, currently, carbonylation of methanol is widely adopted for the manufacturing of acetic acid.

As for a method of manufacturing acetic acid by carbonylation of methanol, the so-called "Monsanto process" is well known for manufacturing acetic acid by a reaction between methanol and carbon monoxide in a water-containing acetic acid solvent into which a rhodium compound and methyl iodide are homogeneously dissolved (Japanese Patent Publication No. S47-3334). In recent years, as an improvement to the Monsanto process technologies of carrying out the above reaction in a heterogeneous system using a catalyst prepared by supporting rhodium on a porous vinylpyridine resin carrier have been proposed and put into practical use (Japanese Patent Application Laid-Open Nos. S63-253047, H05-306253, H05-306254, H06-315637).

Beside the Monsanto process' merit of high acetic acid yield, these improved methods provide three more other advantages: 1) the corrosion of the equipment system and the load of separating/refining produced acetic acid are suppressed by reducing the formation of hydriodic acid via hydrolysis of methyl iodide through lowering the water concentration in the reaction system; 2) a high concentration of rhodium catalyst is obtained by supporting the rhodium complex on resin carrier to achieve a higher reaction rate; and 3) the cost and load necessary for separating/recovering catalyst are decreased by sealing the catalyst in a reactor.

Japanese Patent Publication No. S61-25731 discloses a porous vinylpyridine resin that can be used in these technologies and preparation method that: an oil phase containing vinylpyridine monomer, divinylbenzene (as crosslinker), isooctane (as porous agent), benzoyl peroxide (as initiator), and a water phase containing sodium chloride (for adjusting density and suppressing dissolution of vinylpyridine in water), sodium nitrite (for inhibiting the polymerization of dissolved vinylpyridine), cellulose-based suspension stabilizer, are mixed in a polymerization reactor. The polymerization is carried out first at 80° C. for 2 hours and then at 95° C. for 5 hours after the oil phase is appropriately dispersed.

SUMMARY OF THE INVENTION

However, a vinylpyridine resin obtained by the known method described in Japanese Patent Publication No. S61-25731 is accompanied by a problem that the resin is apt to be pulverized and thermally decomposed. Further, the catalytic activity is acceleratedly degraded as the pores of the resin are clogged by substances released as a result of the pulverization and thermal decomposition.

In view of the above-identified problem, an object of the present invention is to provide a vinylpyridine resin that is resistant to pulverization and thermal decomposition and a method of manufacturing such a vinylpyridine resin. At the same time, the present invention is aimed at accomplishing the suppression of the degradation of the catalytic activity due to thermal decomposition so that the vinylpyridine resin maintains a satisfactory level of catalytic activity.

As a result of intensive research efforts, the inventors of the present invention found that the above-identified problem is resolved by providing a vinylpyridine resin with morphology as follows: a volume ratio of the pores having a diameter of 3 through 5 nm to all the pores of not less than 4% and not more than 60%; a total pore volume of not less than 0.15 cc/g and not more than 0.35 cc/g; and a specific surface area of not less than 20 $m^2/g$ and not more than 100 $m^2/g$.

The inventors of the present invention also found that a vinylpyridine resin with the above mentioned morphology can be manufactured by using a combination of a poor solvent and a good solvent as porous agent, at a weight ratio of the good solvent to the total porous agent of not less than 50 wt % and not more than 90 wt %.

A catalyst of rhodium complex supported on the manufactured vinylpyridine resin exhibits a satisfactory catalytic activity for carbonylation of methanol. And it is hardly pulverized and thermally decomposed. Furthermore, such a catalyst does not lose its activity up to a higher thermal decomposition ratio.

Further features of the present invention will become apparent from the following description of exemplary embodiments with reference to the attached drawings.

DESCRIPTION OF THE EMBODIMENTS

Figure 1:
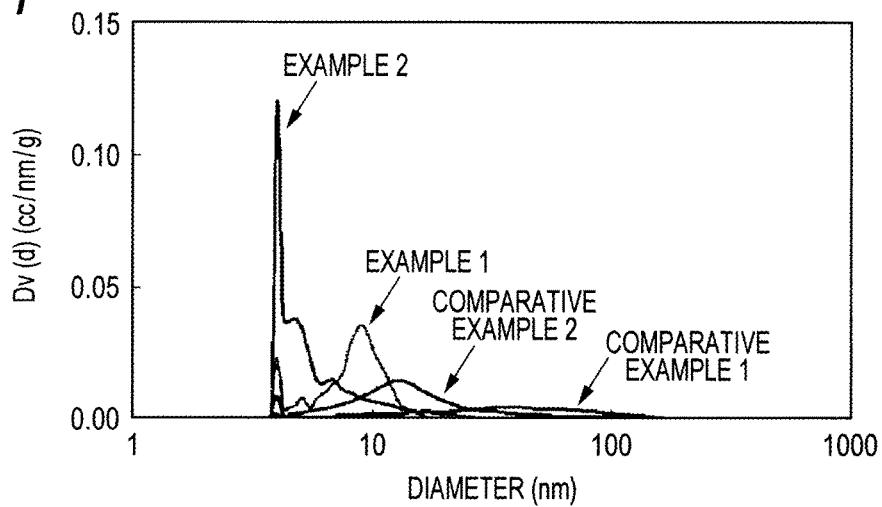
FIG. 1 is a graph showing a representative pore diameter distribution of the resin obtained in Examples and Comparative Examples of the present invention.

Preferred embodiments of the present invention will now be described in detail in accordance with the accompanying drawings.

In a vinylpyridine resin according to the present invention, the volume ratio of the pores having a diameter of 3 through 5 nm to all the pores (to be referred to as 3 through 5 nm pore volume ratio hereinafter) is not less than 4% and not more than 60%, preferably not less than 4% and not more than 50%. Furthermore, in a vinylpyridine resin according to the present invention, the total pore volume is not less than 0.15 cc/g and not more than 0.35 cc/g, preferably not less than 0.15 cc/g and not more than 0.25 cc/g. Still further, the specific surface area is not less than 20 $m^2/g$ and not more than 100 $m^2/g$, preferably not less than 30 $m^2/g$ and not more than 80 $m^2/g$.

As a result of research efforts, the inventors of the present invention found that, when the 3 through 5 nm pore volume ratio is made not less than 4%, a vinylpyridine resin according to the present invention provides an advantage that the pulverizing rate and the thermal decomposition rate of a catalyst carried on the vinylpyridine resin are remarkably lower compared to the conventional vinylpyridine resins.

A vinylpyridine resin to be used for a catalyst carrier is composed of a huge number of microgels that have a size of 0.10 through 100 µm and that are crosslinked to form a network. To raise the ratio of the pores having a small diameter of 3 through 5 nm, the resin needs to include microgels having a reduced size and the fusion of microgels needs to be appropriately controlled. In the instance of a vinylpyridine resin of the present invention that exhibits not less than 4% of a volume ratio of the pores having a diameter of 3 through 5 nm, microgels constituting the resin are homogeneously and densely bound together so that microgels can hardly be released and separated by pulverization and thermal decomposition. Additionally, since the microgels have a small size, the pores are hardly clogged by the released microgels, hence the degradation of the catalytic activity due to the clogged pores is avoided.

On the other hand, when the 3 through 5 nm pore volume ratio exceeds 60%, the diffusion of the reactants becomes rate-determining step, which degrades the apparent reaction activity.

A satisfactory catalytic activity cannot be achieved when the total pore volume is less than 0.15 cc/g or the specific surface area is less than 20 $m^2/g$. Conversely, weak parts are formed in the resin's structure, from where the resin can easily pulverized or thermally decomposed, when the total pore volume exceeds 0.35 cc/g or the specific surface area is larger than 100 $m^2/g$.

A method of manufacturing a vinylpyridine resin according to the present invention is not subjected to any particular limitations. For example, a vinylpyridine resin can be manufactured by polymerization of a suspension of an oil medium containing vinylpyridine monomers, a crosslinking agent, a porous agent and a polymerization initiator, in an aqueous medium, in a polymerization reactor.

If necessary, the aqueous medium may contain a dispersing agent (suspension stabilizing agent), a surfactant, a radical scavenging agent, a specific gravity regulating agent and a pH regulating agent at an appropriate content. Then, a vinylpyridine resin according to the present invention can be manufactured by slowly raising the temperature of the reactor so as to cause polymerization to take place at 50° C. through 80° C., and then further raising the temperature to 85° C. through 95° C. for heat-treatment.

A porous agent to be used for the purpose of the present invention refers to a solvent that dissolves monomers but hardly dissolves polymers which are formed by polymerizing such monomers. For example, an organic solvent having a property of swelling crosslinked copolymers or an organic solvent having a non-swelling property may be used for the purpose of the present invention.

When vinylpyridine resin particles are synthesized by suspension polymerization, a huge number of crosslinked microgels, which have a size of 0.10 through 100 µm are formed as a result of phase separation of the polymers from the porous agent mixed with the monomers. The size of the microgels, the fusion of microgels, and the distribution of the organic solvent in the voids among the microgels, are remarkably influenced by the compatibility of the microgels and the porous agent.

A method of manufacturing a vinylpyridine resin according to the present invention is characterized by adjusting the compatibility between the monomers and the solvent, through combining poor and good solvents relative to vinylpyridine polymers monomers in different ratios, so that the deposition of microgels and the fusion of the deposited microgels through the polymerization of remained monomers in the solvents are well regulated.

The compatibility of a polymer and a solvent that is employed as porous agent depends on their polarities. The degree of compatibility is high when the polarities are close to each other. A solubility parameter (SP) expressed by the square root of the cohesive energy density that indicates the inter-molecular binding force is employed as a measure for solubility. For the purpose of the present invention, when an absolute value of the difference between the SP of a solvent and monomers is smaller than 2, the solvent is defined as a good solvent, whereas when the absolute value is larger than 2, the solvent is defined as a poor solvent.

Examples of good solvents that can be used for the purpose of the present invention include trimethylbenzene, toluene, xylene and 2-ethylhexanol, etc. Examples, on the other hand, of poor solvents include dioctyl phthalate, octane and nonane, etc.

For the purpose of the present invention, the expression of "combining" is employed for both of porous agents and polymerization initiators. As far as porous agents are concerned, two or more porous agents are mixed and used for suspension polymerization; whereas as far as polymerization initiators are concerned, two or more polymerization initiators are mixed and used for suspension polymerization. Two or more porous agents or polymerization initiators may be mixed in advance or, alternatively, added separately and mixed in a reactor by agitation.

As a result of an elaborate study, the inventors of the present invention believe that a vinylpyridine resin having desired characteristics can be obtained due to the actions as below.

When only a poor solvent is employed as porous agent, a phase separation of the polymer formed as a result of polymerization of monomers and having relatively low molecular weight from the solvent occurs immediately as compared with the case of using only the good solvent so that relatively small microgels are deposited first. The deposited microgels take in unreacted monomers that are highly compatible to the microgels and fuse with neighboring ones to grow up into microgels having a relatively larger size. At this time, the voids of the microgels are filled by the monomers that have been taken in so that large pores which are attributable to the voids occupied by poor solvent among the large microgels are developed in the finally obtained resin. The resin obtained in this way is composed of large microgels with small contact interfaces because of the developed large pores, which leads to the microgels to be easily released due to pulverization and thermal decomposition. The pores can easily be clogged by the released large microgels and consequently the catalytic activity is degraded.

When, on the other hand, only a good solvent is employed as porous agent, the phase separation of the formed polymer having relatively low molecular weight from the solvent hardly occurs as compared with the case of using only the poor solvent and thus microgels are deposited only after they have sufficiently grown to a certain size. At this time, only a small amount of monomers is left in the solvent. Additionally, since the left monomers are homogenously distributed in both the good solvent and the microgels, the deposited microgels can hardly fuse with each other via polymerization of the left monomers; and hence only fine pores which are attributable to the good solvent dispersed uniformly in the voids among the microgels are produced. The finally obtained resin has pores with only a small diameter, and hence the resin does not provide satisfactory catalytic activity due to limited mass-transfer.

To the contrary, a method of manufacturing a vinylpyridine resin according to the present invention is characterized by employing a poor solvent and a good solvent in combination to regulate appropriately the phase separation of the polymer from the solvent. Thus, the size of the deposited microgels and the fusion of the deposited microgels via the polymerization of the left monomers in the solvent are regulated so that microgels having a large size do not develop as observed in the instance of using only a poor solvent, and hence a resin in which relatively smaller microgels are densely bound together can be obtained. Since the good solvent is highly compatible with the microgels as compared with the poor solvent, a part of the good solvent is taken into the microgels and solvates their skeletons. The mixture of the residual good solvent and the poor solvent is uniformly dispersed in the voids of the microgels. Thus, the voids among the microgels are not completely clogged by monomers and pores having a diameter of 3 through 5 nm are uniformly produced in the entire resin when the good solvent and the poor solvent are removed after the formation of the resin.

Thus, a macroporous type resin in which microgels are densely bound and pores having an appropriate size, which are attributable to the voids among the microgels, are developed, can be obtained in this way. Since microgels of relatively smaller sizes are densely bound in this resin, pulverization and thermal decomposition of the resin caused by releasing and separating of microgels can be suppressed. Additionally, since the microgels constituting the vinylpyridine resin are small, the pores in the resin are hardly clogged by microgels released and separated due to pulverization or thermal decomposition so that the catalytic activity is hardly degraded.

The composition of the porous agent that is employed for the purpose of the present invention can vary with the nature of the good solvent and the poor solvent that are employed. The good solvent preferably occupies not less than 50 wt % and less than 90 wt %, more preferably not less than 60 wt % and not more than 85 wt %, of the total weight of the porous agent.

When the content of the good solvent is less than 50 wt %, the deposited microgels grow to large size while taking in monomers in the solvent, and hence the pores attributable to the voids among the microgels also become large. Furthermore, pores having a diameter of 3 through 5 nm are not formed to a necessary number. When the content of the good solvent is more than 90 wt %, a resin having pores with only a small diameter are obtained, and hence the resin does not provide satisfactory catalytic activity due to limited mass-transfer.

The good solvent is preferably selected from compounds having a benzene ring such as trimethylbenzene, toluene and xylene. Due to the high compatibility between the benzene ring of the good solvents and the aromatic rings of the copolymer of vinylpyridine and divinylbenzene, such good solvents can be uniformly distributed in the skeletons in the microgels and the voids among the microgels. As a result, a large number of pores having a diameter of 3 through 5 nm are formed and uniformly distributed. Since the structure of the resin is free from nonuniformity, pulverization and thermal decomposition of the resin hardly take place.

Vinylpyridine monomers that can be used for the purpose of the present invention non-limitatively include 2-vinylpyridine, 3-vinylpyridine, 4-vinylpyridine, and 4-vinylpyridine or 2-vinylpyridine derivatives having one or more small alkyl groups such as methyl groups and/or ethyl groups on the pyridine ring.

2-methyl-5-vinylpyridine, 2-ethyl-5-vinylpyridine, 3-methyl-5-vinylpyridine, 2,3-dimethyl-5-vinylpyridine, and 2-methyl-3-ethyl-5-vinylpyridine can also be included. These monomers may be used alone or in combination of two or more monomers.

Crosslinking agent, a compound having two or more vinyl groups, can be used for the purpose of the present invention. Examples of such compounds include: aromatic polyvinyl compounds such as divinylbenzene, divinyl toluene, divinyl naphthalene and trivinyl benzene; aliphatic polyvinyl compounds such as butadiene, diaryl phthalate, ethylene glycol diacrylate and ethylene glycol dimethacrylate; and polyvinyl-containing nitrogen heterocyclic compounds such as divinyl pyridine, trivinyl pyridine, divinyl quinoline and divinyl isoquinoline. The crosslinking agent is used at a ratio of 20 through 60 wt %, preferably 25 through 35 wt % relative to the monomer.

Polymerization initiators that can be used for the purpose of the present invention are not subjected to any particular limitations. Any conventional initiators that initiate a reaction of a vinyl compound, such as benzoyl peroxide, lauroyl peroxide and azobisisobutyronitrile etc, may be used for the purpose of the present invention. The polymerization initiator is used at a ratio of 0.5 through 5.0 wt %, preferably 0.7 through 2.0 wt % relative to the total amount of monomer mixture.

For the purpose of the present invention, preferably one of the above defined polymerization initiators is employed as main polymerization initiator in combination with an auxiliary polymerization initiator having a 10-hour half-life temperature lower than that of the main polymerization initiator.

As the reaction temperature is raised by the heat of polymerization reaction to 100° C., the water phase will boil and cause coalescence of the dispersed oil droplets. If only the main polymerization initiators having high 10-hour half-life temperature are employed, the oil phase/water phase ratio needs to be reduced to remove a part of the heat of reaction and to control the reaction temperature below 100° C. Thus, the quantity of resin manufactured per batch is inevitably decreased.

To the contrary, if a main polymerization initiator and an auxiliary polymerization initiator are used in combination, the polymerization temperature can be lowered while the polymerization rate is held to a constant level. As a result, the heat of polymerization reaction can be removed with ease and the oil phase/water phase ratio can be raised to a higher level; and consequently, the quantity of resin manufactured per batch can be increased.

Exemplary compounds that can be used as auxiliary polymerization initiator for the purpose of the present invention include 2,2'-Azobis(2,4-dimethylvaleronitrile) and 2,2'-Azobis(2-methylbutyronitrile). The ratio of the main polymerization initiator to the auxiliary polymerization initiator is, for instance, 1:0.2 through 1:1.0, preferably 1:0.3 through 1:0.5, although the ratio depends on the types of the main polymerization initiator and auxiliary polymerization initiator that are actually put to use.

Similarly, dispersing agents that can be used for the purpose of the present invention are not subjected to any particular limitations. Conventional dispersing agents that can be used for the purpose of the present invention include: water-soluble polymers such as polyvinyl alcohol, hyroxyethyl cellulose, carboxymethyl cellulose, sodium polymethacrylate, sodium polyacrylate, starch, gelatin and ammonium salt of styrene/maleic anhydride copolymer; and inorganic salts such as calcium carbonate, calcium sulfate, bentonite and magnesium silicate.

Furthermore, surfactants, radical scavenging agents, specific gravity regulating agents and pH regulating agents that can be used for the purpose of the present invention are not subjected to any particular limitations. And any conventional agents for the respective purpose can be used. Exemplary surfactants include dodecylbenzenesulfonic acid, exemplary radical scavenging agents include sodium nitrite, exemplary specific gravity regulating agents include sodium chloride, and exemplary pH regulating agents include sodium hydroxide.

A vinylpyridine resin manufactured according to the present invention can have the form of particles with a diameter of not less than 50 μm and not more than 1,500 μm, preferably not less than 200 μm and not more than 1,000 μm.

A vinylpyridine resin manufactured according to the present invention can be applied in the field of manufacturing acetic acid in a heterogeneous catalytic system with a rhodium complex carried on the resin.

EXAMPLES

1. Preparation of Vinylpyridine Resin

Example 1

An aqueous solution of 6250 g containing 10 wt % of NaCl (specific gravity regulating agent), 0.3 wt % of $NaNO_2$ (radical scavenging agent), 0.064 wt % of gelatin (dispersing agent) and 0.009 wt % of sodium dodecylbenzenesulfonate (surfactant) in ion exchange water was prepared as water phase.

An oil phase of 3750 g was prepared by mixing 4-vinylpyridine (vinylpyridine monomer), divinylbenzene (purity: 55 wt %) (crosslinking agent), 1,2,4-trimethylbenzene (good solvent) and dioctyl phthalate (poor solvent) at a composition of 36.4 wt %, 43.6 wt %, 15 wt % and 5 wt %, respectively.

Additionally, 0.84 wt % of benzoyl peroxide (polymerization initiator) and 0.34 wt % of 2,2'-azobis(2,4-dimethylvaleronitrile) (auxiliary polymerization initiator) were dissolved in the above oil phase. The oil phase was first put into a 10 L suspension polymerization reactor equipped with a jacket. Then, the prepared water phase was supplied into the reactor from its bottom. The oil phase and the water phase were mixed by slow agitation.

The mixture was agitated until oil droplets were uniformly dispersed. Subsequently, the temperature of the mixture in the reactor was raised by flowing warm water of 65° C. into the jacket of the reactor to initiate the polymerization of the monomers. As the temperature of the mixture in the reactor exceeded 60° C., the increase rate of the temperature of reactants started to rise until the peak temperature of 80° C. was reached. After the temperature was gradually decreased to 60° C. The mixture in the reactor was further heated to 90° C. and held at that temperature for hours. Subsequently, the mixture in the reactor was cooled to room temperature. The synthesized resin was separated from the liquid by filtration. The porous agents, 1,2,4-trimethylbenzene and dioctyl phthalate, contained in the collected resin were removed by extracting and washing. The final product of 4-vinylpyridine resin used for catalyst carriers was obtained by classifying with a sieve.

Example 2

A 4-vinylpyridine resin carrier was obtained as in Example 1 except that 5 wt % of octane and 15 wt % of toluene were used respectively as poor solvent and as good solvent instead of dioctyl phthalate and 1,2,4-trimethylbenzene.

Example 3

A 4-vinylpyridine resin carrier was obtained as in Example 1 except that 6 wt % of octane and 14 wt % of toluene were used respectively as poor solvent and as good solvent.

Example 4

A 4-vinylpyridine resin carrier was obtained as in Example 1 except that a 3 $m^3$ suspension polymerization reactor (water phase: 1650 kg, oil phase: 990 kg) equipped with a jacket was used.

Comparative Example 1

A 4-vinylpyridine resin carrier was obtained as in Example 1 except that only 20 wt % of isooctane was used as porous agent.

Comparative Example 2

A 4-vinylpyridine resin for catalyst was obtained as in Example 1 except that 10 wt % of octane and 10 wt % of toluene were used respectively as poor solvent and as good solvent.

Comparative Example 3

A 4-vinylpyridine resin for catalyst was obtained as in Example 1 except that 0.91 wt % of benzoyl peroxide and 0.27 wt % of 2,2'-azobis(2,4-dimethylvaleronitrile) were used respectively as polymerization initiator and auxiliary polymerization initiator.

Comparative Example 4

A 4-vinylpyridine resin for catalyst was obtained as in Example 1 except that the temperature of the jacket water was raised to 65° C. at a rate of 10° C./hr.

2. Measurement of Physical Properties

The physical properties of the obtained 4-vinylpyridine resins as catalyst carriers were measured as below.

(1) Measurement of Specific Surface Areas, Pore Volumes, Average Pore Diameters of Resins The specific surface area, the pore volumes (total pore volume, 3 through 5 nm pore volume) and the average pore diameter of each of the obtained 4-vinylpyridine resins as catalyst carriers were measured by a nitrogen adsorption method (AUTOSORB-1: tradename, available from YUASA IONICS Co., Ltd.).

(2) Measurement of Pulverization Ratio 17 g (dry) of each of the obtained 4-vinylpyridine resins as catalyst carriers were added to 100 g of methanol solution containing 17 wt % of methyl iodide. The slurry was shaken at room temperature for 18 hours for quaternization of the pyridine groups in the resin.

The quaternized 4-vinylpyridine resin as catalyst carriers was put into a 300 ml cylindrical separable flask (equipped with 4 baffles) and agitated at 1000 rpm for 18, 72 and 144 hours with a 40-mm disk turbine.

After the agitation, the slurry was filtered by a sieve with 90-μm opening. The filtrate was received in a 300-ml beaker with a known weight and dried at 90° C. to obtain the pulverized substance, whose weight was then measured. The pulverization ratio was calculated as the weight ratio of the obtained pulverized substance to the used 4-vinylpyridine resin as catalyst carriers. The pulverization rates were obtained by dividing the pulverization ratio (%) with the agitation time. The average value of the pulverization rates of 72 and 144 hours was used as the pulverization rate for Examples and Comparative Examples.

(3) Measurement of Catalytic Activity
(i) Catalyst Preparation

The catalyst was prepared by adding 8.5 g (dry-base) of each of the obtained 4-vinylpyridine resin, 79.7 g of reactant (containing 31.3 wt % of methanol, 21.6 wt % of methyl iodide, and 47.1 wt % of acetic acid), and appropriate amount of rhodium acetate into a 200-ml zirconium-clad autoclave and allowing them to react at 180° C. under 5.0 MPaG CO for 1 hour.

(ii) Reaction Test

All the obtained catalyst and 80 g of reactants (containing 25 wt % of methanol, 62.5 wt % of acetic acid, 12.5 wt % of methyl iodide) were load into a 200-ml zirconium-clad autoclave. The carbonylation reaction was carried out at 180° C. under 5.0 MPaG CO for 1 hour. The carbonylation reaction rate was calculated from the amount of consumed CO or produced acetic acid.

Table 1 represents the physical properties of the obtained 4-vinylpyridine resins as catalyst carriers and FIG. 1 represents the typical pore diameter distributions.

Figure 2:
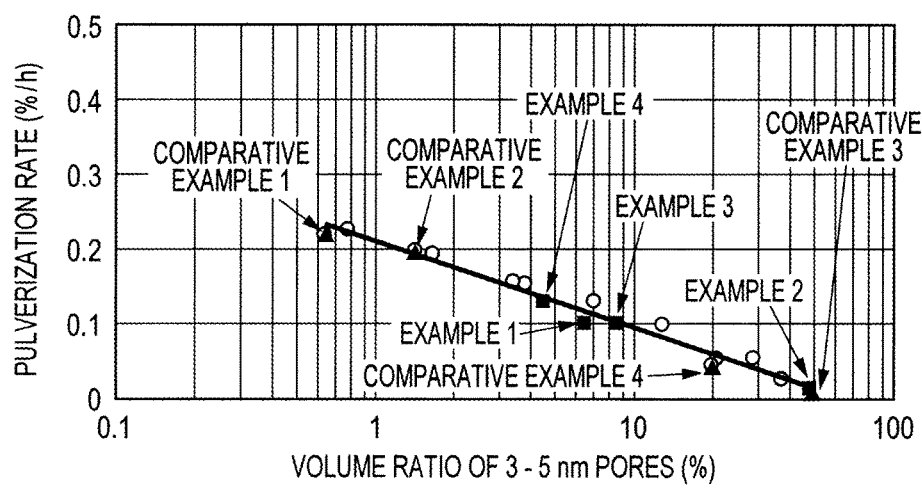
FIG. 2 is a graph representing the relationship between the volume ratio of the pores having a diameter of 3 through 5 nm to all the pores and the pulverization speed of the resin.

FIG. 2 plots the relationship between the volume ratio of the pores having a diameter of 3 through 5 nm to that of all the pores and the pulverization rate. It can be seen from FIG. 2 that the pulverization rate decreases with increment of the volume ratio of the pores having a diameter of 3 through 5 nm.

Figure 3:
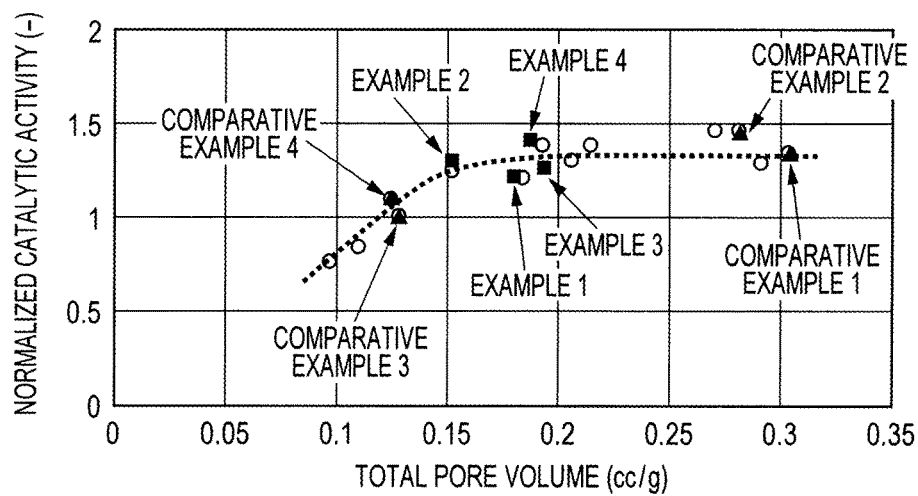
FIG. 3 is a graph representing the relationship between the total pore volume of the resin manufactured according to the present invention and the normalized catalytic carbonylation reaction activity.

FIG. 3 represents the relationship between the total pore volume and the normalized catalytic carbonylation reaction activity. As shown in FIG. 3, the carbonylation reaction catalytic activity remains constant when the pore volume is larger than 0.15 cc/g.

(4) Measurement of Thermal Decomposition Ratio and its Relationship with Catalytic Activity The catalysts prepared with the 4-vinylpyridine resins obtained in Example 1 and Comparative Example 1 were subjected to a thermal decomposition test carried out according to the following procedures. The thermal decomposition ratio and its relationship with the catalytic carbonylation reaction activity were investigated.

(i) Accelerated Thermal Decomposition Test

The corresponding catalyst of each of the obtained 4-vinylpyridine resins was prepared according to the above-described method and put into a 200-ml zirconium-clad autoclave with 100 ml of acetic acid. The autoclave was heated to 220° C. with agitating. Subsequently, a sample of solution was collected at every 24 hours, and analyzed for nitrogen concentration to obtain the amount of the released pyridine groups. The thermal decomposition ratio was calculated by dividing the amount of released pyridine groups with that of the total pyridine groups, which was measured separately in advance.

Figure 4:
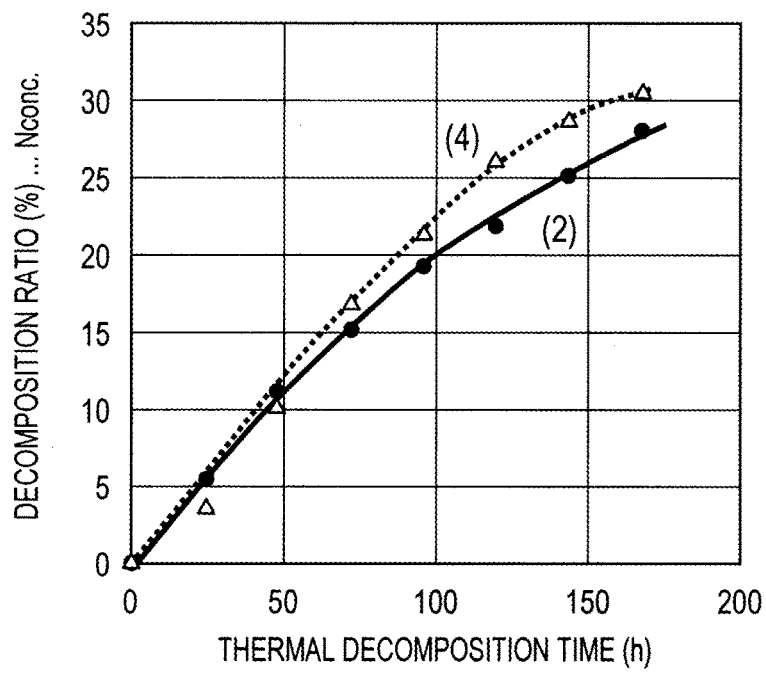
FIG. 4 is a graph representing the relationship between the thermal decomposition time and the catalyst decomposition rate in Example 1 and in Comparative Example 1.

FIG. 4 represents the relationship between the thermal decomposition time and the catalyst decomposition ratio. As seen from FIG. 4, the thermal decomposition rate of Example 1 (2) is lower than that of Comparative Example 1 (4).

Figure 5:
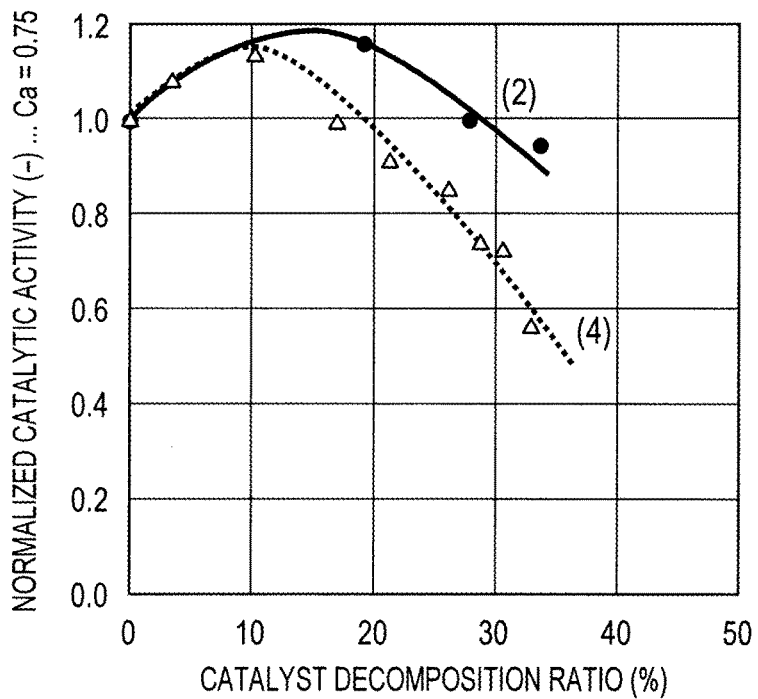
FIG. 5 is a graph representing the relationship between the catalyst decomposition ratio and the normalized catalytic carbonylation reaction activity in Example 1 and in Comparative Example 1.

FIG. 5 represents the relationship between the catalyst decomposition ratio and the catalytic carbonylation reaction activity, which was normalized by the activity of the corresponding untreated catalyst. The catalytic carbonylation reaction activity of the Comparative Example 1 (4) fell below that of the untreated catalyst when it decomposed to a ratio of 20%. In contrast, the corresponding decomposition ratio of Example 1 (2) was 30%, suggesting a higher thermal stability than the Comparative Example 1 (4).

An activity higher than the initial activity was observed for both Example 1 and Comparative Example 1 at low

TABLE 1

| | specific surface area (m²/g) | average pore diameter (nm) | pore volume (A) total (cc/g) | pore volume (B) 3-5 nm pores (cc/g) | (B)/(A) (%) | pulverization rate (wt %/h) | normalized carbonylation reaction activity* (—) |
|---|---|---|---|---|---|---|---|
| Example 1 | 51.7 | 13.2 | 0.180 | 0.012 | 6.5 | 0.10 | 1.20 |
| Example 2 | 48.6 | 10.7 | 0.152 | 0.073 | 47.8 | 0.01 | 1.30 |
| Example 3 | 45.5 | 15.9 | 0.193 | 0.017 | 8.5 | 0.10 | 1.26 |
| Example 4 | 54.0 | 13.5 | 0.188 | 0.008 | 4.5 | 0.13 | 1.40 |
| Comp. Ex. 1 | 30.2 | 37.2 | 0.305 | 0.002 | 0.6 | 0.22 | 1.35 |
| Comp. Ex. 2 | 53.3 | 21.2 | 0.282 | 0.004 | 1.4 | 0.20 | 1.45 |
| Comp. Ex. 3 | 46.2 | 11.1 | 0.128 | 0.063 | 49.0 | 0.01 | 1.00 |
| Comp. Ex. 4 | 33.5 | 13.4 | 0.125 | 0.025 | 20.0 | 0.04 | 1.10 |

*The activity of Comparative Example 3 that shows the lowest value was defined as 1.

decomposition ratios. This is subscribed to the enhanced diffusion of reactants resulted from the thermally enlarged distance among microgels.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A vinylpyridine resin to be used for catalyst carriers, exhibiting characteristics of: a volume ratio of pores having a diameter of 3 through 5 nm to all the pores of not less than 4% and not more than 60%; a total pore volume of not less than 0.15 cc/g and not more than 0.35 cc/g; and a specific surface area of not less than 20 $m^2/g$ and not more than 100 $m^2/g$.

2. A vinylpyridine resin to be used for catalyst carriers according to claim 1, wherein the vinylpyridine resin is a copolymer of vinylpyridine and divinylbenzene.

* * * * *